Feb. 22, 1944. H. R. ELLINWOOD Re. 22,439

HYDRAULIC CYLINDER BYPASS CONTROL

Original Filed June 18, 1941 3 Sheets-Sheet 1

Inventor

Herman Ray Ellinwood

By R. S. Birney

Attorney

Feb. 22, 1944. H. R. ELLINWOOD Re. 22,439

HYDRAULIC CYLINDER BYPASS CONTROL

Original Filed June 18, 1941 3 Sheets-Sheet 2

Inventor
Herman Ray Ellinwood
By R. S. Berry
Attorney

Feb. 22, 1944. H. R. ELLINWOOD Re. 22,439
HYDRAULIC CYLINDER BYPASS CONTROL
Original Filed June 18, 1941 3 Sheets-Sheet 3
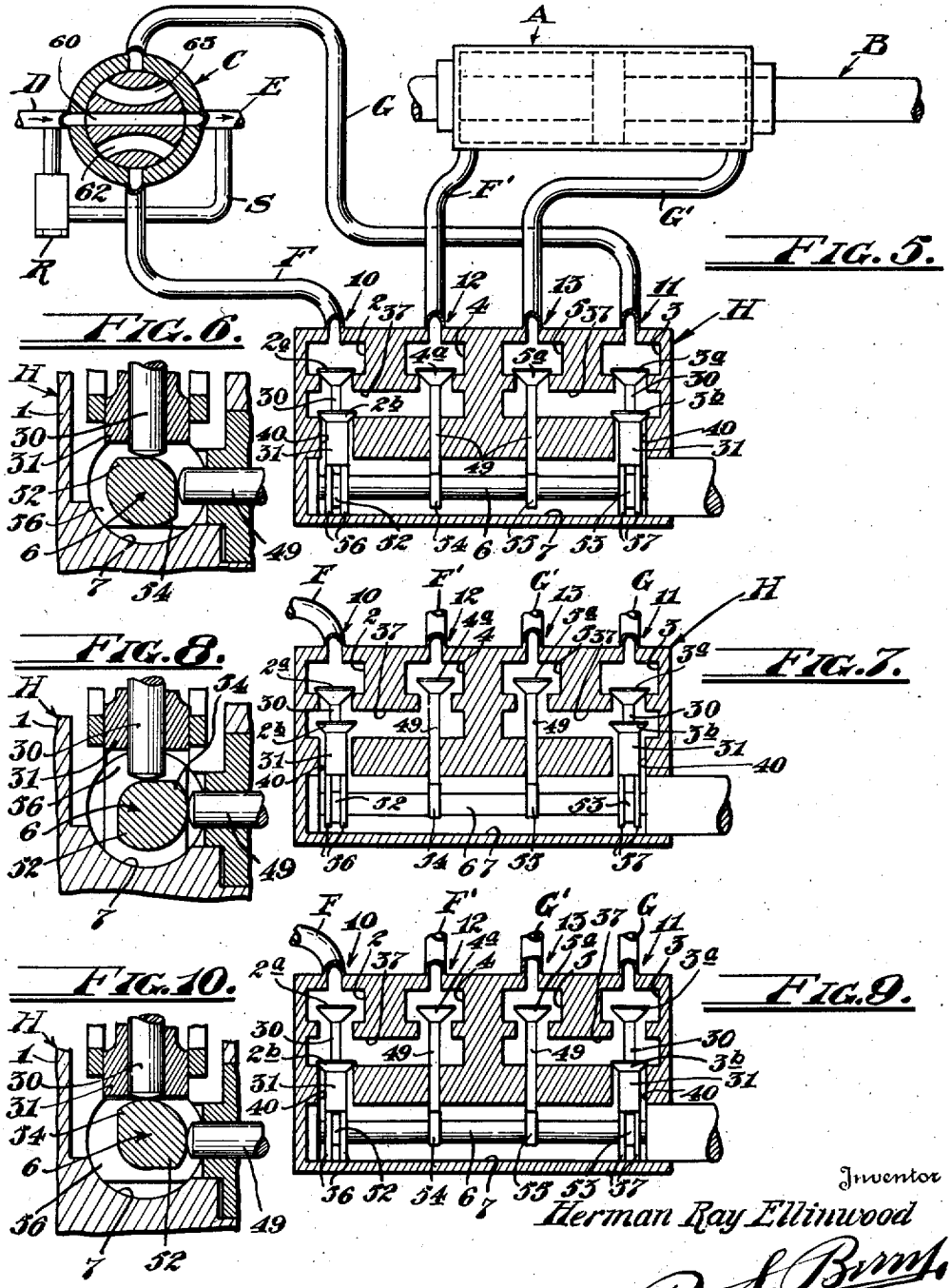
Inventor
Herman Ray Ellinwood
By R. S. Burns
Attorney Reissued Feb. 22, 1944

Re. 22,439

UNITED STATES PATENT OFFICE 22,439

HYDRAULIC CYLINDER BY-PASS CONTROL

Herman Ray Ellinwood, Burbank, Calif., assignor to Adel Precision Products Corp., a corporation of California Original No. 2,300,112, dated October 27, 1942, Serial No. 398,621, June 18, 1941. Application for reissue January 1, 1944, Serial No. 516,699

7 Claims. (Cl. 121—40)

My invention relates to valves for controlling the operation of hydraulic cylinders or jacks as used for operating as well as boosting the operation of airplane controls, for example, the diving brake flaps, rudders and the like, also other airplane mechanisms and devices which are subject to hydraulic operation and control.

It is the common practice to control the operation of hydraulic cylinders used in airplanes for the above noted and analogous purposes, by means of 4-way valves which permit of selectively hydraulically extending and retracting the pistons of the cylinders, but such valves do not make possible a manual or other external actuation of the cylinders and airplane controls connected therewith, nor provide for hydraulically locking the controls or devices in predetermined positions, in a manner which has been found to be most essential to an efficient operation of airplanes.

In consequence it is an object of my invention to provide a flow control valve which is designed for use in combination with a 4-way valve controlled hydraulic cylinder assembly, and adapted to be selectively operated as follows:

1. To lock or trap the fluid in both ends of the cylinder and thereby hold the airplane control or device operated by the cylinder, in any position into which it is hydraulically or otherwise moved.

2. To permit the fluid to by-pass from one end of the cylinder to the other and thereby allow of free movement of the piston in either direction and a manual or other operation of the airplane control or device apart from hydraulic actuation of the piston.

3. To allow of selective operation of the cylinder under full control of the 4-way valve whereby the piston of the cylinder may be hydraulically extended or retracted.

4. To achieve the aforesaid hydraulic locking and by-passing operation at will and selectively regardless of the position of the 4-way valve and thereby simplify, expedite and render more reliable the operation of controlling the hydraulic cylinder in accordance with this invention.

Another object of my invention is to provide a fluid control valve assembly of the character described in which six valve units are so constructed and so arranged in four bores within a small valve body of such form that appreciable and highly desirable reductions as to weight, size and machining costs as well as the use of a simple form of means for selectively operating said valves, are afforded.

Another object of my invention is to provide a new and highly efficient hydraulic system wherein two selectively operable valves make possible a full hydraulic operation, or a hydraulic boosting operation, or a full manual or other external operation of a member or device connected to the piston or plunger of the hydraulic cylinder, also a hydraulic locking of the piston or plunger in any position within the limits of its movement.

With the foregoing objects in view, together with such other objects and advantages as may subsequently appear, the invention is carried into effect as illustrated by way of example in the accompanying drawings, in which:

Fig. 5 is a schematic view of a hydraulic system embodying my invention and including a 4-way valve and the valve of my invention with the latter in "locking" position, the fluid being trapped in both ends of the cylinder and thereby locking piston against movement;

Fig. 6 is a fragmentary sectional view showing the position of the cam shaft and valve stems when the valve assembly is in the position shown in Fig. 5;

Fig. 7 is a schematic view of the valve assembly as when in by-passing position in which the fluid will by-pass from one end of the cylinder to the other to allow free movement of the piston in either direction;

Fig. 8 is a fragmentary sectional view of the cam shaft and valve stems as when the valve assembly is in by-passing position shown in Fig. 7;

Fig. 9 is a schematic view of the valve assembly as when in free flow position in which the cylinder is controlled solely by the 4-way valve to hydraulically extend and retract the piston;

Fig. 10 is a fragmentary sectional view of the cam shaft and valve stems as when the valve is in free flow position shown in Fig. 9.

Figure 1:
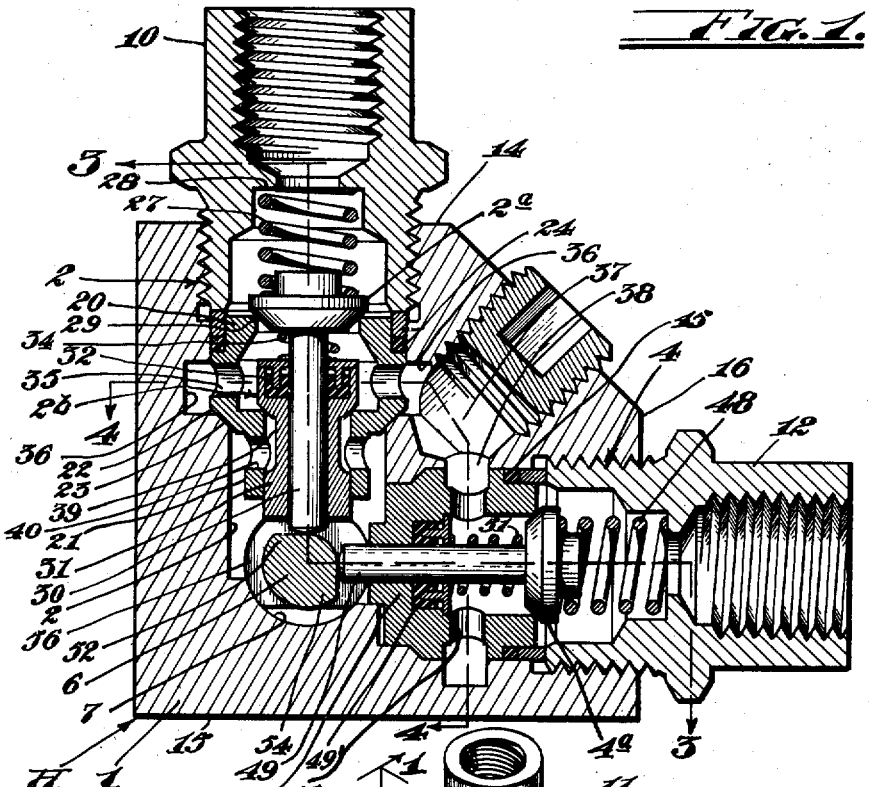
Fig. 1 is a vertical sectional view of a valve embodying my invention; taken on the plane 1—1 of Fig. 2.
Figure 2:
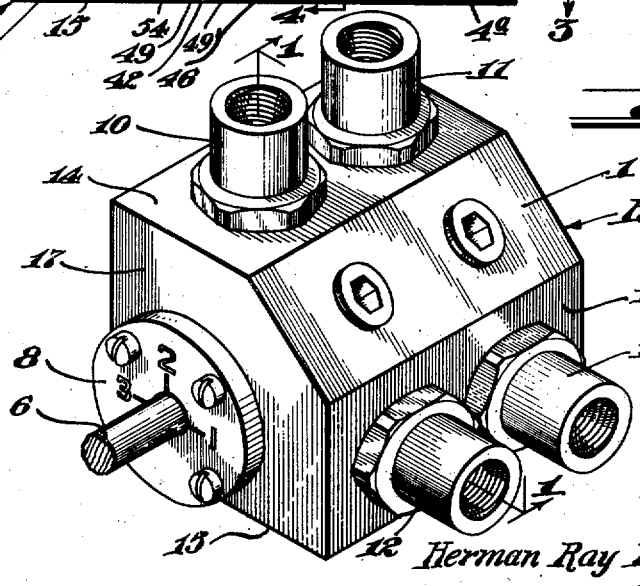
Fig. 2 is a perspective view of the valve shown in Fig. 1.

Referring to the drawings more specifically, Figs. 1 to 4 inclusive show a valve assembly embodying my invention and which generally includes a body 1 having valve bores 2, 3, 4, and 5, poppet valves 2a and 2b in the bore 2, poppet valves 3a and 3b in the bore 3, and poppet valves 4a and 5a in the bores 4 and 5 respectively. A single rotary cam shaft 6 mounted in a bore 7 in the body 1 provides for operating the aforesaid poppet valves as will be hereinafter more fully described, said cam shaft being of such form that the bore 6 serves as a fluid passageway between the inner ends of the bores 2 and 3. The cam shaft is movable into three positions as indicated by the characters "1," "2," and "3" spaced 90 degrees apart on a disk 8 at one end of the body 1, said three positions determining the hydraulic locking, the by-passing and the free flow 4-way valve control positions of the valve as respectively illustrated in Figs. 5, 7, and 9 as to the valve and in Figs. 6, 8 and 10 as to the cam shaft and associated parts. The cam shaft may be rotated by any suitable means, not shown. Threaded into the outer ends of the bores 2, 3, 4 and 5 are fittings 10, 11, 12 and 13 respectively for connecting the valve in a hydraulic system.

One hydraulic system embodying my invention is shown in Fig. 5 and includes a hydraulic cylinder A, a piston B in said cylinder, adapted to be connected to an airplane control or device, not shown, a 4-way valve C, pressure and return lines D and E leading from a hydraulic pump unit, not shown, to the 4-way valve, a relief by-pass valve R in a by-pass line S around the valve C, fluid lines F and G leading from the 4-way valve to the fittings 10 and 11 of a valve assembly H embodying my invention, and fluid lines F' and G' leading from the fittings 12 and 13 of said valve assembly to the opposite ends of the cylinder A.

Before describing the operation of the system shown schematically in Figs. 5, 7 and 9, the construction of the valve assembly H will be described.

Figure 3:
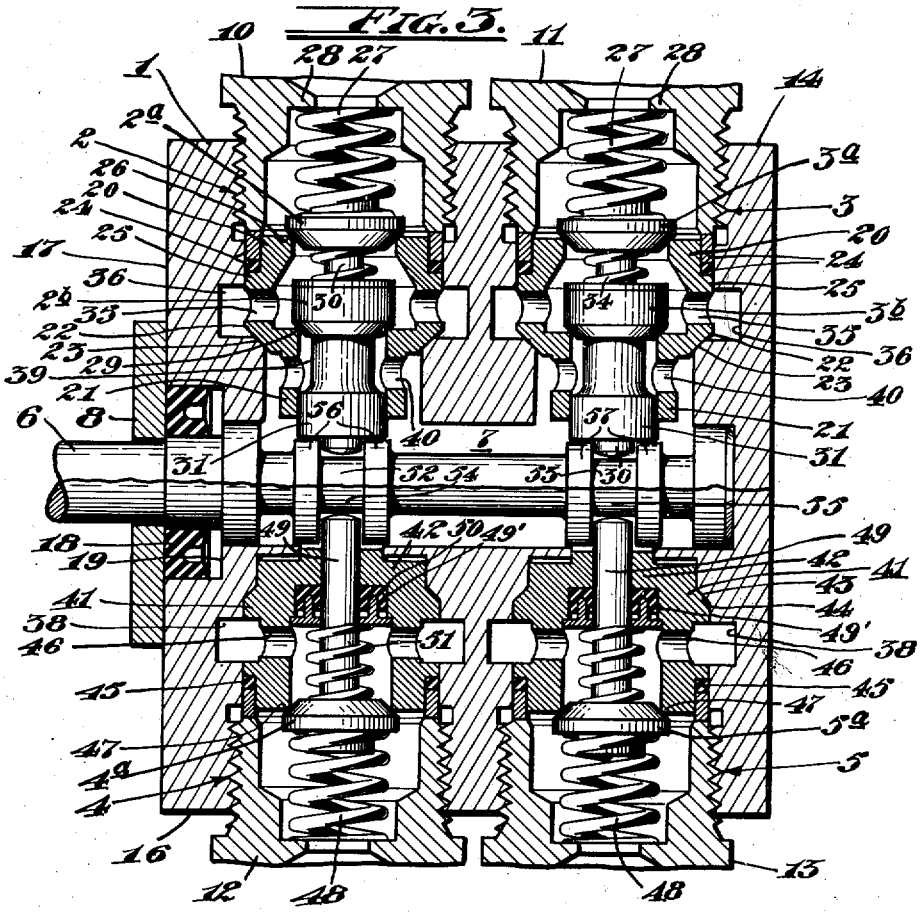
Fig. 3 is a sectional view taken on the line 3—3 of Fig. 1.
Figure 4:
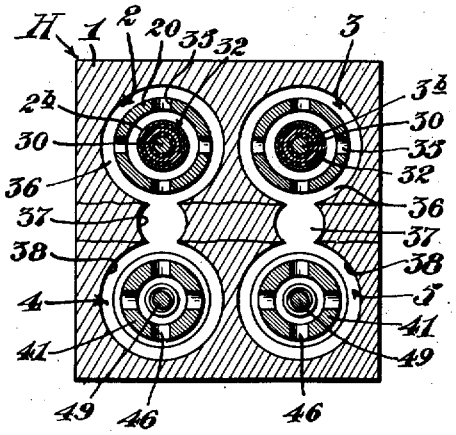
Fig. 4 is a sectional view taken on the line 4—4 of Fig. 1.

With reference to Figs. 1 to 4 inclusive, it is seen that the bores 2 and 3 are extended from the upper surface 14 of the body 1 to a point near but spaced from the lower surface 15 in spaced parallel relation to one another, whereas the bores 4 and 5 extend at right angles to bores 2 and 3 and open on the front face 16 of the body, while the cam shaft bore 7 intersects the inner ends of all the valve bores and opens on the end face 17 through which the cam shaft 6 extends as seen in Fig. 3. A suitable sealing means 18 for said shaft is mounted in a recess 19 in the end face 17. Thus in effect the valve bores 2 and 4 form an L-shaped valve chamber whereas the valve bores 3 and 5 form a similar valve chamber, the cam shaft bore intersecting the junctures of valve bores and the two L-shaped chambers being in spaced parallel relation to one another.

Removably seated in the bore 2 is a cylindrical seat member 20 having a reduced inner portion 21 and a beveled annular shoulder 22 which latter seats on a beveled shoulder 23 intermediate the ends of said bore. Sealing rings 24 are seated in a shoulder 25 on the member 20 and lie between said member and the wall of the bore 2, being held in place by means of the inner end of the fitting 10 contacting with the outermost sealing ring as shown in Figs. 1 and 3. It is now seen that member 20 serves as a partition means dividing the inner end and outer portion of the bore and provides for connection thereof only through its bore. The valve 2a is adapted to engage a seat 26 on the outer end of the member 20 and is held seated by means of a spring 27 engaged between the valve and an annular shoulder 28 in the fitting 10.

A valve seat 29 for the valve 2b is formed between the ends of and within the bore of the cylindrical seat member 20. The valve 2b is tubular and the stem 30 of the valve 2a is slidable in the bore of and extends beyond the tubular stem portion 31 of valve 2b. The stem portion 31 has a sliding fit in the reduced inner end portion 21 of the seat member 20. A metal reinforced non-collapsible sealing ring 32 is seated in a recess 33 in the outer end of the valve 2b to prevent leakage along the stem 30. A spring 34 of less tension than spring 27 holds the valve 2b seated and also holds the ring 32 in place.

In the seat member 20 above the seat 29 are radial ports 35 opening into an annular enlargement or recess 36 in the bore 2. A passage 37 in the body 1 connects the enlargement 36 with a similar enlargement 38 in the bore 4 for the valve 4a.

The tubular valve 2b is reduced between its ends to define an annular chamber 39 within the reduced part 21 of the member 20 which chamber is at all times in communication with the inner end of the bore 2 and cam shaft bore 7 by means of radial ports 40 in the portion 21, whereby the cam shaft bore will serve as a connecting passage between the inner ends of the valve bores 2 and 3 for by-passing the fluid as indicated in Fig. 7 and as will be hereinafter described.

Mounted in the valve bore 4 is a cylindrical valve seat member 31 having an end wall 42 closing the inner end thereof and sealing the inner end of said bore, there being cooperating beveled shoulders 43 and 44 on the wall of the bore 4 and exterior of the member 41 respectively. The inner end of the fitting 12 engages sealing rings 45 corresponding to the rings 24 and holds the member 41 in place with its radial ports 56 in registration with the enlargement 38 of bore 4.

At its outer end the member 41 has an annular seat 47 for the valve 4a which latter is normally seated by means of a spring 48 arranged as is the spring 27. The stem 49 of the valve 4a extends through the wall 42 for contact with the cam shaft 6, there being a sealing means 49' identical with the sealing means 32 and held in a recess 50 in the wall 42 by means of a spring 51.

As the valves 3a and 3b and associated ports in the bore 3 are identical with the valves 2a and 2b respectively and their associated parts, and as the valve 5a and associated parts are identical with valve 4a and its associated parts, the same reference characters are used to designate such like parts throughout the drawings and specifications hereof.

The cam shaft 6 is provided with cams 52 and 53 set alike for simultaneously engaging the stems 30 of the valves 2a and 3a and opening said valves as shown in Figs. 9 and 10, when the cam shaft is turned to "free flow" position permitting full control of the hydraulic cylinder through the 4-way valve C. When the shaft is in this position cams 54 and 55 thereon also simultaneously engage the stems 49 the valves 4a and 5a and open said valves as also shown in Figs. 9 and 10. The cams 54 and 55 also adapted to simultaneously engage the stems 49 of and open the valves 4a and 5a when the cam shaft is turned to "by-pass" position, as shown in Figs. 7 and 8. Cams 56 and 57 on the shaft 6 are set to engage the stems 31 of valves 2b and 3b and open said valves only when the shaft is turned to by-pass position as shown in Figs. 7 and 8. Figs. 6, 8 and 10 show the cam shaft cams and valve stems when the valves are in the positions shown in Figs. 5, 7 and 9 respectively, said valve positions being respectively the fluid locking position, the by-passing position, and the free flow position in which the cylinder is under full control of the 4-way valve C.

It should be noted that the body 1 may be conveniently made from bar stock and comparatively inexpensively provided with the necessary bores and passages for accommodating six valves in four bores whereby to render the assembly more compact and appreciably reduce the size and weight thereof. Moreover, the construction of the cylindrical seat members and valves and their relative arrangement makes possible a reduction in machining costs compared to valves in which the seats and associated ports and chambers are machined in the body itself. Again, this construction makes for a quick and accurate assembling and disassembling of the valve and seat elements to facilitate repair and replacement of parts.

Referring again to the hydraulic system shown in Figs. 5, 7, and 9, it is seen that when it is desired to lock an airplane control or device (not shown) and which is connected with the piston B, in any position into which it may have been moved hydraulically or by a manual or other means independent of hydraulic actuation of the piston, the operator merely moves the cam shaft 6 of the valve assembly H into position shown in Fig. 6 whereby the poppet valves in said assemply will close as shown in Fig. 5. Closing of poppet valves 2a and 3a will shut off the pressure fluid to the valve H and cylinder A, and closing of poppet valves 4a and 5a will trap the fluid in the cylinder A on opposite sides of the piston B and thereby lock the piston. Should the 4-way valve be in the position shown in Fig. 5 when the poppet valves are closed as aforesaid, the pressure fluid will circulate freely through pressure line D, port 60 in valve C, and return line E. Inasmuch as in systems such as here shown the hydraulic pump, not shown, is operated continuously, it is noted that should the valve C be in other than the position shown in Fig. 5 pressure increase caused by the closed valves 2a and 3a will open the pressure relief valve R in the by-pass line S whereby the pressure fluid will by-pass around the valve C into the return line E. This pressure relief check valve is set to open only when a pressure increase well above the normal working pressure is attained, for example, as a result of closing poppet valves 2a and 3a. It is now apparent that the fluid locking operation of the valve H is in no way dependent on the 4-way valve C as to the latter being set or moved into any particular position and this is important as it insures a quicker, easier and more positive fluid locking and releasing operation.

When it is desired to release the piston B for free movement in either direction to permit of operation of the airplane control device manually or by means other than a hydraulic actuation of the piston, the cam shaft 6 is turned to the position shown in Fig. 8 and the by-pass valves 2b and 3b, also the valves 4a and 5a are simultaneously opened as shown in Fig. 7. When the piston is now moved in either direction by external means as aforesaid, fluid will by-pass from one end of the cylinder to the other around the piston as follows: through the lines F' and G', fittings 12 and 13, bores 4 and 5, open valves 4a and 5a, passages 37, enlargements 36 in bores 2 and 3, ports 35 in cylindrical seat members 30, past the open valves 2b and 3b, through the reduced portions 21 of members 20, ports 40 in said reduced portions, inner ends of bores 2 and 3, and cam shaft bore 7 which completes the by-pass circuit. As the piston has equal areas on opposite sides thereof the fluid displaced by the piston from either end of the cylinder is accommodated in the other end of the cylinder.

As the valves 2a and 3a are closed when this by-passing operation takes place, the fluid cannot flow back into lines F and G. Moreover, inasmuch as valves 2a and 3a are closed at this time, it is seen that the by-passing operation of valve H is in no way dependent on a particular position of the 4-way valve. The relief valve R will open and allow pressure fluid to by-pass around the valve C if the latter is in a position other than shown in Fig. 5.

When it is desired to operate the cylinder A with the 4-way valve C to hydraulically extend or retract the piston B, the cam shaft 6 of the valve assembly H is turned to position shown in Fig. 10 and the valves 2a, 3a, 4a and 5a are opened, whereas by-pass valves 2b and 3b are closed, and the valve C is then manipulated to bring its ports 62 and 63 into registration with the pressure and return lines D and E and the lines F and G.

Assuming the valve is operated so that port 62 establishes a connection between lines D and F as the pressure line to valve H, and port 63 establishes connection between lines G and E as the fluid return line, then the pressure fluid is effective in the fitting 10, cylindrical seat member 20 for the then open valve 2a, ports 35, enlargement 36 of bore 2, passage 37, enlargement 38 of bore 4 for then open valve 4a, ports 46, seat member 41, fitting 12, line F' and the left end of the cylinder A. The piston is now moved to the right or extended, while the fluid in the right end of the cylinder returns through line G', fitting 13, seat member 41 in bore 5, past open valve 5a, ports 46, passage 37 to port 3, ports 35, seat member 20 in bore 3, past open valve 3a, through fitting 11 and line G, valve port 63 to return line E at valve C. It is obvious from the foregoing that when the valve 6 is turned to communicate its port 63 with the lines D and G and its port 62 with the lines E and F the piston will be retracted.

It is important to note that the valve means and the system embodying my invention make possible the operation and control of airplane controls or airplane carried devices in such manner as to permit of a most efficient operation of airplanes with greater facility and safety due to the fact that said controls or devices may be selectively manually operated, hydraulically operated, and operated by means other than the hydraulic cylinder, and also readily hydraulically locked at will in the desired positions and likewise quickly released.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a hydraulic control valve, a body having a plurality of valve receiving bores opening on outer faces thereof and a cam shaft receiving bore, valve seats axially spaced apart between the ends of each valve receiving bore of a pair thereof, inwardly seating axially spaced poppet valves in each bore of said pair having stems extending into said cam shaft receiving bore, a valve seat disposed between the ends of each bore of another pair of said valve receiving bores, an inwardly seating poppet valve in each bore of said second named pair having a stem extending into said cam shaft receiving bore, means affording the communication of each valve receiving bore at a point between its outer end and the next adjacent valve seat therein with a fluid line, a fluid passage in the body having one terminal communicated with a bore of said first named pair at a point between the valve seats therein and its other terminal communicated with a bore of said second named pair at a point spaced inwardly of the valve seat in the latter, another fluid passage having one terminal communicated with the other bore of the first named pair at a point between the valve seats therein and its other terminal communicated with the other bore of the second named pair at a point inwardly of the valve seat in the latter, the inner ends of the valve bores of the first named pair opening into said cam shaft bore which serves as a fluid passage between said inner ends, and a cam shaft operable in the bore therefor for controlling said valves.

2. In a hydraulic control valve, a body having a plurality of valve receiving bores opening on outer faces thereof and a cam shaft receiving bore, valve seats axially spaced apart between the ends of each valve receiving bore of a pair thereof, inwardly seating axially spaced poppet valves in each bore of said pair having stems extending into said cam shaft receiving bore, a valve seat disposed between the ends of each bore of another pair of said valve receiving bores, an inwardly seating poppet valve in each bore of said second named pair having a stem extending into said cam shaft receiving bore, means affording the communication of each valve receiving bore at a point between its outer end and the next adjacent valve seat therein with a fluid line, a fluid passage in the body having one terminal communicated with a bore of said first named pair at a point between the valve seats therein and its other terminal communicated with a bore of said second named pair at a point spaced inwardly of the valve seat in the latter, another fluid passage having one terminal communicated with the other bore of the first named pair at a point between the valve seats therein and its other terminal communicated with the other bore of the second named pair at a point inwardly of the valve seat in the latter, the inner ends of the valve bores of the first named pair opening into said cam shaft bore which serves as a fluid passage between said inner ends, and a cam shaft operable in the bore therefor for controlling said valves, the bores of the second named pair being extended substantially at right angles to bores of the first named pair in the plane of the latter.

3. In a hydraulic control valve, a body having a plurality of valve receiving bores opening on outer faces thereof and a cam shaft receiving bore, valve seats axially spaced apart between the ends of each valve receiving bore of a pair thereof, inwardly seating axially spaced poppet valves in each bore of said pair having stems extending into said cam shaft receiving bore, a valve seat disposed between the ends of each bore of another pair of said valve receiving bores, an inwardly seating poppet valve in each bore of said second named pair having a stem extending into said cam shaft receiving bore, means affording the communication of each valve receiving bore at a point between its outer end and the next adjacent valve seat therein with a fluid line, a fluid passage in the body having one terminal communicated with a bore of said first named pair at a point between the valve seats therein and its other terminal communicated with a bore of said second named pair at a point spaced inwardly of the valve seat in the latter, another fluid passage having one terminal communicated with the other bore of the first named pair at a point between the valve seats therein and its other terminal communicated with the other bore of the second named pair at a point inwardly of the valve seat in the latter, the inner ends of the valve bores of the first named pair opening into said cam shaft bore which serves as a fluid passage between said inner ends, and a cam shaft operable in the bore therefor for controlling said valves, tubular valve seat members in the bores of the second named pair having the aforesaid valve seats on their outer ends and provided with means on their inner ends for sealing the inner ends of the second named pair of bores.

4. In a hydraulic control valve, a body having a plurality of valve receiving bores opening on outer faces thereof and a cam shaft receiving bore, valve seats axially spaced apart between the ends of each valve receiving bore of a pair thereof, inwardly seating axilially spaced poppet valves in each bore of said pair having stems extending into said cam shaft receiving bore, a valve seat disposed between the ends of each bore of another pair of said valve receiving bores, an inwardly seating poppet valve in each bore of said second named pair having a stem extending into said cam shaft receiving bore, means affording the communication of each valve receiving bore at a point between its outer end and the next adjacent valve seat therein with a fluid line, a fluid passage in the body having one terminal communicated with a bore of said first named pair at a point between the valve seats therein and its other terminal communicated with a bore of said second named pair at a point spaced inwardly of the valve seat in the latter, another fluid passage having one terminal communicated with the other bore of the first named pair at a point between the valve seats therein and its other terminal communicated with the other bore of the second named pair at a point inwardly of the valve seat in the latter, the inner ends of the valve bores of the first named pair opening into said cam shaft bore which serves as a fluid passage between said inner ends, and a cam shaft operable in the bore therefore for controlling said valves, tubular valve seat members seated in the valve receiving bores for providing the aforesaid valve seats, and fittings extending into said bores and holding said seat members therein.

5. In a hydraulic control valve, a body having a plurality of valve receiving bores opening on outer faces thereof and a cam shaft receiving bore, valve seats axially spaced apart between the ends of each valve receiving bore of a pair thereof, inwardly seating axially spaced poppet valves in each bore of said pair having stems extending into said cam shaft receiving bore, a valve seat disposed between the ends of each bore of another pair of said valve receiving bores, an inwardly seating poppet valve in each bore of said second named pair having a stem extending into said cam shaft receiving bore, means affording the communication of each valve receiving bore at a point between its outer end and the next adjacent valve seat therein with a fluid line, a fluid passage in the body having one terminal communicated with a bore of said first named pair at a point between the valve seats therein and its other terminal communicated with a bore of said second named pair at a point spaced inwardly of the valve seat in the latter, another fluid passage having one terminal communicated with the other bore of the first named pair at a point between the valve seats therein and its other terminal communicated with the other bore of the second named pair at a point inwardly of the valve seat in the latter, the inner ends of the valve bores of the first named pair opening into said cam shaft bore which serves as a fluid passage between said inner ends, and a cam shaft operable in the bore therefor for controlling said valves, tubular valve seat members seated in the valve receiving bores for providing the aforesaid valve seats, and fittings extending into said bores and holding said seat members therein, said tubular seat members having ports for registration with said passages.

6. In a fluid control valve, a body having a cam shaft bore and a pair of valve receiving bores extending radially from the cam shaft bore and opening through outer faces of the body, a pair of valve seats axially spaced apart in one of the valve receiving bores, a pair of poppet valves arranged to seat inwardly against said seats, concentric stems on said valves extending into said cam shaft bore, a valve seat in the other valve receiving bore, a poppet valve arranged to seat inwardly against the seat in the second named valve bore, means embodied in the body for communicating the portions of the valve bores between their outer ends and the next adjacent valves therein with fluid lines, a fluid passage in the body having one terminal communicated with a point in the first named valve bore between the valve seats therein, and its other terminal communicated with the second named valve bore at a point inwardly spaced from the seat in the latter, and a cam shaft operable in the bore therefor to selectively operate said valves.

7. In a fluid control valve, a body having a cam shaft bore and a pair of valve receiving bores extending radially from the cam shaft bore and opening through outer faces of the body, a pair of valve seats axially spaced apart in one of the valve receiving bores, a pair of poppet valves arranged to seat inwardly against said seats, concentric stems on said valves extending into said cam shaft bore, a valve seat in the other valve receiving bore, a poppet valve arranged to seat inwardly against the seat in the second named valve bore, means embodied in the body for communicating portions of the valve bores between their outer ends and the next adjacent valves therein with fluid lines, a fluid passage in the body having one terminal communicated with a point in the first named valve bore between the valve seats therein, and its other terminal communicated with the second named valve bore at a point inwardly spaced from the seat in the latter, and a cam shaft operable in the bore therefor to selectively operate said valves, a cylindrical seat member in the first named valve bore having the valve seats for said bore located at its outer end and between its ends respectively and provided with ports inwardly spaced from the respective seats, a cylindrical seat member in the second named valve bore having the valve seat for said bore on its outer end and provided with a port spaced inwardly of said seat and a wall at its inner end closing the inner end of a second named bore, fittings in the outer ends of the valve bores engaging and holding said seat members in place, springs between said fittings and valves in said bores for seating such valves, and a spring between the valves in the first named bore for seating the inner valve of said pair.

HERMAN RAY ELLINWOOD.